E. W. MARSHALL.
POWER RAMP.
APPLICATION FILED FEB. 12, 1913. RENEWED MAY 6, 1914.
1,127,661.
Patented Feb. 9, 1915.
2 SHEETS—SHEET 1.
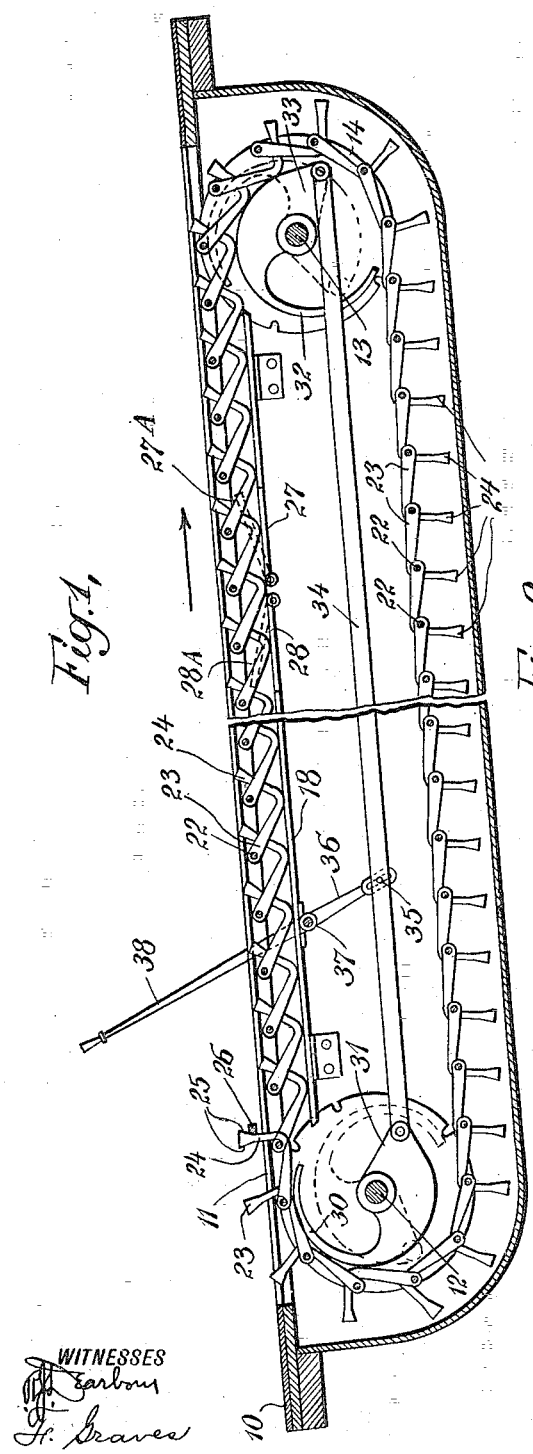
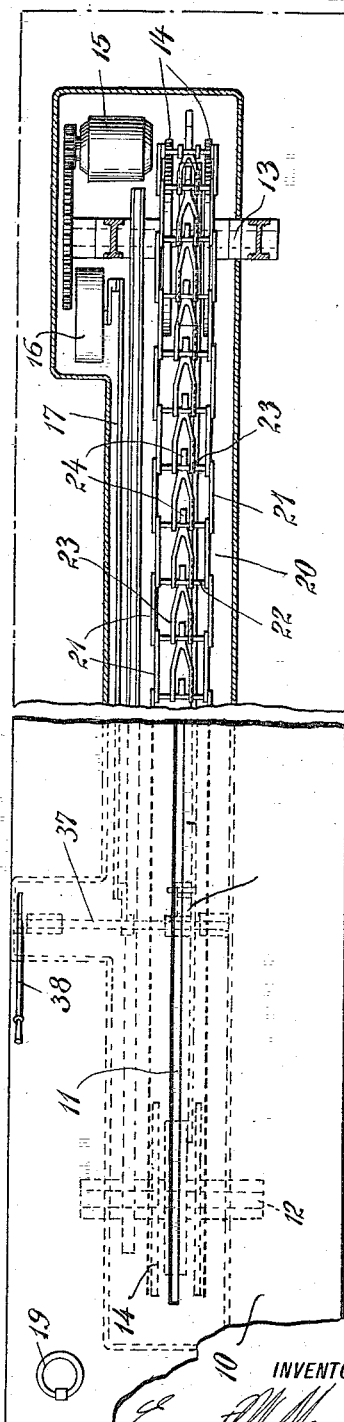

E. W. MARSHALL.
POWER RAMP.
APPLICATION FILED FEB. 12, 1913. RENEWED MAY 6, 1914.
1,127,661.
Patented Feb. 9, 1915.
2 SHEETS—SHEET 2.
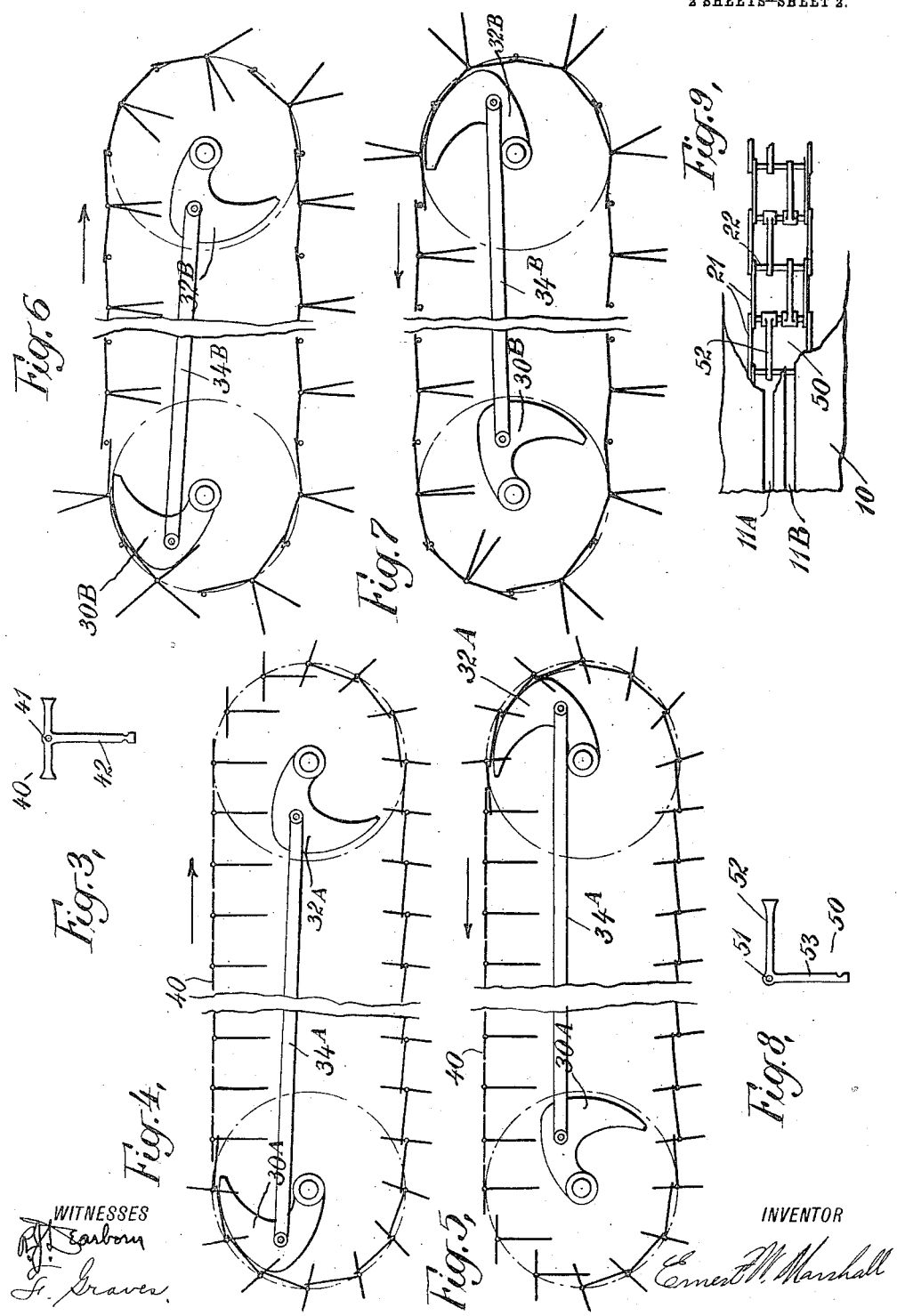

UNITED STATES PATENT OFFICE.

ERNEST W. MARSHALL, OF YONKERS, NEW YORK, ASSIGNOR TO GEORGE H. FROTHINGHAM COMPANY, OF NEW YORK, N. Y., A CORPORATION OF NEW YORK.

POWER-RAMP.

1,127,661.      Specification of Letters Patent.      Patented Feb. 9, 1915.

Application filed February 12, 1913, Serial No. 747,895. Renewed May 6, 1914. Serial No. 836,813.

*To all whom it may concern:*

Be it known that I, ERNEST W. MARSHALL, a citizen of the United States, and a resident of the city of Yonkers, county of Westchester, and State of New York, have invented certain new and useful Improvements in Power-Ramps, of which the following is a specification, reference being had to the accompanying drawings, forming a part thereof.

My invention relates to power ramps and its object is to provide with a ramp, a motor driven mechanism adapted to assist in moving hand-trucks or other objects along the ramp but which shall not obstruct the working surface of the ramp when not engaged with such an object.

More specifically its object is to provide a mechanism by which objects may be pushed along the ramp in one direction or their movements retarded, and which is reversible.

Another object is to simplify such mechanisms as have heretofore been known.

I will describe my invention in the following specification and point out the novel features thereof in appended claims.

Referring to the drawings:—

Figure 1 is a sectional side elevation of a ramp which embodies my invention.

Fig. 2 is a plan view partly in section of the apparatus shown in Fig. 1.

In Fig. 3 a modified form of engaging member is shown in elevation. This form of engaging member is used in the arrangements shown in Figs. 4 and 5 which are diagrammatic elevations of a modified structure.

Another modification is similarly illustrated diagrammatically in Figs. 6 and 7. One of the engaging members of this structure is shown in elevation in Fig. 8 and Fig. 9 is a plan view of a portion of a ramp with two slots, a part of the ramp platform being broken away to show the arrangement of the driving chain and the engaging members thereon.

Like characters of reference designate corresponding parts in all the figures.

10 designates the platform of a ramp through the greater portion of the length of which is a slot 11. Under this platform and near its ends are supported shafts 12, 13 on each of which is affixed a pair of sprocket wheels such as 14.

15 is a reversible motor which is geared to drive the shaft 13.

20 is a chain made up of links 21 and transverse pins 22. These pins are equally spaced and are arranged to be engaged by pockets in the peripheries of the sprocket wheels 14. On each of these pins is pivotally supported the bifurcated end 23 of an engaging member which extends beyond the next adjacent pin and has an arm 24 at substantially right angles to its bifurcated portion. This arm is somewhat narrower than the slot 11 and its outer end is preferably spread out forward and back as shown at 25 in Fig. 1.

Supported on the shaft 12 between the sprocket wheels thereon is a cam 30 from which extends an actuating arm 31. A similar cam 32 is supported on shaft 13 and its actuating arm 33 is connected with the arm 31 by a rod or bar 34. A pin 35 projecting from one side of this bar passes through a slot in a lever 36 which is affixed to a transverse shaft 37. A control lever 38 projects from this shaft through the ramp platform near one of its sides.

The motor 15 is provided with a controller 16 which is operatively connected by a rod 17 with the shaft 37.

18 is a guide parallel with the ramp platform and a fixed distance below the slot 11. The ramp may be provided with rings 19 by means of which it may be lifted and its position changed. Preferably its mechanism below the platform is inclosed in a casing as shown.

Before specifically describing the modifications illustrated in the drawings, I will describe the operation of the apparatus shown in Figs. 1 and 2. The ramp may be placed for example between a dock and the deck of a freight vessel. Over it may be carried hand trucks or other objects in the usual way. If it is inclined as shown in Fig. 1 and the movement of objects over it is upward, the control lever 38 may be moved into the position in which it is shown in the drawings. This will cause the cams 30 and 32 to assume the positions in which they are shown in full lines and will cause the motor to drive the chain in the direction indicated by the arrow in Fig. 1. As the engaging members pass between the sprocket wheels on shaft 12 they will ride over cam 30 which will cause their arms 24 to be raised up through the slot 11. If an object such as the axle 26 of a hand truck is on that portion of the ramp it will be engaged by the arm 24 and pushed up the ramp thereby. If there is nothing on the ramp platform the engaging members will drop down onto the guide 18 as soon as they pass off from cam 30, with their ends below the surface of the ramp platform. If the inclination of the ramp is opposite that shown in Fig. 1 and its chain is being driven in the same direction, trucks or other objects may be run against the other side of the arms 24 and their movement down the ramp retarded or limited to the rate of movement of the chain. The operator may reverse the direction of rotation of the motor and the consequent direction of movement of the chain by throwing over the control lever 38. This will at the same time swing the cams 30 and 32 into the positions in which they are shown in dotted lines. Then as the engaging members pass between the sprocket wheels on shaft 13 in a counter-clock-wise direction, their arms 24 will be successively pushed up through slot 11 to serve either for pushing or retarding an object on the ramp platform.

The mechanism described for temporarily raising the arms of the engaging members through slot 11 are located near the ends of the ramp. If desired there may be other devices provided for performing this function at one or more intermediate parts of the ramp. This is particularly desirable when the ramp is a permanent part of a building and extends through several of its floors.

In Fig. 1, 27 and 28 designate pivoted portions of the guide 18, which portions may be respectively swung into the positions indicated by dotted lines at 27$^A$ and 28$^A$ to push up the engaging members.

In Figs. 3, 4 and 5, 40 designates T-shaped engaging members aranged to be pivoted at 41 on transverse chain-pins like those previously described. In this case the depending arm 42 is heavy enough to swing into vertical position when free to do so, and is long enough to engage adjacent chain-pins on either side of the one on which it is pivoted.

In Fig. 4 the movement of the upper portion of the chain is from left to right and the cam 30$^A$ is in position to so act upon the long arms 42 of the engaging members as to successively raise one of the short arms of each up above the platform of the ramp.

In Fig. 5 the cam 32$^A$ is positioned to perform a like function when the chain is running in the opposite direction.

50 in Fig. 8 is an inverted L-shaped engaging member such as is shown in Figs. 6, 7 and 9. These are arranged to be swung at 51 on the chain pins 22 and each comprises an engaging arm 52 and a depending arm 53. These are mounted side by side on the pins 22 and consequently two slots 11$^A$ and 11$^B$ are provided for them through the ramp platform.

In the diagram Fig. 6, the cam 30$^B$ is positioned to be active and the cam 32$^B$ to be inactive, which is the way they are set when the chain runs in the direction indicated by the arrow.

Fig. 7 shows the same parts adjusted for running in the opposite direction.

I have illustrated several modifications of my invention to show that it is not limited to any particular construction or arrangement of parts. I am aware that the general principles set forth herein are described in a co-pending application for patent Serial No. 695,370 filed by Clarence Healy, May 6, 1912, and I only claim herein such improvements as I have made over his invention.

What I claim is:

1. In a ramp having a platform with a longitudinal slot therein, a reversible endless chain, a plurality of gravity members thereon, and means at a predetermined part of the ramp for successively raising the members temporarily above the surface of the platform, said members being arranged to be maintained in their raised position by engagement therewith of an object on the platform on either side of the members and in either of their directions of movement.

2. In a ramp having a platform, an endless chain, a reversible motor connected therewith, a plurality of driving members on the chain, a cam near each end of the ramp for successively raising the driving members temporarily above the surface of the platform and means for reversing the motor and simultaneously moving one cam into operative position and the other cam into inoperative position.

3. In a ramp having a platform, an endless chain, a reversible motor connected therewith, a plurality of driving members on the chain, a cam near each end of the ramp for successively raising the driving members temporarily above the surface of the platform, and a manually operated control lever operatively connected with the motor and with both of the cams whereby the direction of rotation of the motor and the adjustment of the cams may be effected.

4. In a ramp, having a platform, an endless chain, a plurality of driving members thereon, means near each end of the ramp for successively raising the driving members temporarily above the surface of the platform, and other means intermediate the means near the ends of the ramp for successively raising the driving members temporarily above the surface of the platform.

5. In a ramp having a platform, an endless chain, a plurality of driving members thereon each having an engaging arm with a broadened end, and means at a predetermined part of the ramp for successively raising said engaging arms temporarily above the surface of the platform.

6. In a ramp having a platform, a reversible endless chain comprising a plurality of transverse pins, L-shaped driving members each pivoted near the end of one of its arms on one of said pins, and a cam near each end of the ramp arranged to raise the ends of the free arms of the driving members successively and temporarily above the surface of the platform.

7. In a ramp having a platform, a reversible endless chain comprising a plurality of transverse pins, L-shaped driving members each pivoted near the end of one of its arms on one of said pins, and a cam near each end of the ramp arranged to raise the ends of the free arms of the driving members successively and temporarily above the surface of the platform, said arms being arranged to be maintained in their raised position by engagement therewith of an object on the platform on either side of the members and in either of their directions of movement.

In witness whereof, I have hereunto set my hand this 11th day of February in the year 1913.

ERNEST W. MARSHALL.

Witnesses:
R. J. DEARBORN,
F. GRAVES.

Copies of this patent may be obtained for five cents each, by addressing the "Commissioner of Patents, Washington, D. C."